(12) United States Patent
Huang et al.

(10) Patent No.: US 7,570,986 B2
(45) Date of Patent: Aug. 4, 2009

(54) TENIAE COLI GUIDED NAVIGATION AND REGISTRATION FOR VIRTUAL COLONOSCOPY

(75) Inventors: Hui-Yang Huang, Rockville, MD (US); Dave A. Roy, Dallas, TX (US); Ronald M. Summers, Potomac, MD (US)

(73) Assignee: The United States of America as represented by the Secretary of Health and Human Services, Washington, DC (US)

( * ) Notice: Subject to any disclaimer, the term of this patent is extended or adjusted under 35 U.S.C. 154(b) by 81 days.

(21) Appl. No.: 11/436,889

(22) Filed: May 17, 2006

(65) Prior Publication Data

US 2007/0270682 A1 Nov. 22, 2007

(51) Int. Cl.
*A61B 5/05* (2006.01)
(52) U.S. Cl. .................................. 600/425; 600/407
(58) Field of Classification Search ................... 600/425
See application file for complete search history.

(56) References Cited

U.S. PATENT DOCUMENTS

| | | | | |
|---|---|---|---|---|
| 5,928,627 A * | 7/1999 | Kiefer et al. | ................... | 424/9.6 |
| 6,212,420 B1 * | 4/2001 | Wang et al. | ................... | 600/407 |
| 6,556,696 B1 * | 4/2003 | Summers et al. | ............ | 382/128 |
| 6,632,451 B2 * | 10/2003 | Penhasi et al. | ............... | 424/464 |
| 7,209,536 B2 * | 4/2007 | Walter et al. | .................... | 378/5 |
| 7,241,736 B2 * | 7/2007 | Hunter et al. | .................. | 514/2 |
| 2005/0048456 A1 * | 3/2005 | Chefd'hotel et al. | ......... | 434/267 |
| 2005/0119550 A1 * | 6/2005 | Serra et al. | ................... | 600/407 |
| 2005/0226483 A1 * | 10/2005 | Geiger et al. | ............... | 382/128 |
| 2006/0062450 A1 * | 3/2006 | Yoakum-Stover et al. | ... | 382/154 |

OTHER PUBLICATIONS

L. Mahajan, Colonoscopy, Oct. 2002, Techniques in Gastrointestinal Endoscopy, vol. 4, No. 4, pp. 213-220.*

* cited by examiner

*Primary Examiner*—Long V Le
*Assistant Examiner*—Saurel J Selkin
(74) *Attorney, Agent, or Firm*—Townsend and Townsend and Crew LLP

(57) ABSTRACT

A computer-assisted method for detecting surface features in a virtual colonoscopy. The method includes providing a three-dimensional construction of a computed tomography colonography surface; creating a path along the teniae coli from the proximal ascending colon to the distal descending colon on the colonography surface; forming an indexed computed tomography colonography surface using the created path; and registering the supine and prone scans of the computed tomography colonography surface using the indexed computed tomography colonography surface. The method also includes navigating the internal surface of the computed tomography colonography using the indexed computed tomography colonography surface.

20 Claims, 10 Drawing Sheets

1. Appendix
2. Cecum
3. Ascending Colon
4. Transverse Colon
5. Descending Colon
6. Sigmoid Colon (a)

(b)

(a) Polyp1 viewed in the supine scan (b) Polyp 1 viewed in the prone scan (c) Polyp 2 viewed in the supine scan (d) polyp 2 viewed in the prone scan (e) Polyp 3 viewed in the supine scan (f) Polyp 3 viewed in the prone scan

TENIAE COLI GUIDED NAVIGATION AND REGISTRATION FOR VIRTUAL COLONOSCOPY

STATEMENT AS TO RIGHTS TO INVENTIONS MADE UNDER FEDERALLY SPONSORED RESEARCH OR DEVELOPMENT

This invention was made with Government support under a contract awarded by the Department of Health and Human Services, National Institutes of Health. The Government has certain rights to this invention.

BACKGROUND OF THE INVENTION

The present invention relates to a navigation system for use with a virtual colonoscopy. In particular, the present invention relates to a teniae coli derived coordinate system for guiding virtual colonoscopic navigation and for the registration of lesions in multiple scanned data sets.

Colorectal cancer, the second leading cause of cancer-related deaths per year in industrialized nations (e.g., see J. D. Potter, M. L. Slattery, R. M. Bostick, S. M. Gapstur, "Colon cancer: a review of the epidemiology," *Epidemiol Rev.*, vol. 15, no. 2, pp. 499-545, 1993), is an important public health concern. It may be prevented by early discovery and removal of precursor polyps. Optical colonoscopy is a widely-used procedure available to examine the colonic mucosa and is regarded as the gold standard for detection of colorectal polyps and cancer. However, the procedure is invasive, uncomfortable and requires intravenous sedation. Thus, screening recommendations are often ignored by the public. The introduction of a noninvasive or minimally invasive procedure for colonic evaluation should prove more widely appealing.

Virtual colonoscopy, also known as CT colonography (CTC), is a less invasive alternative to optical colonoscopy for examining the entire colon to detect polyps. This technique reconstructs a virtual endoscopic view within the colonic lumen from a cross-sectional imaging modality. In addition to conventional tomographic slice views, the virtual luminal navigation allows the observer to visualize normal and pathologic anatomy directly in three-dimensional (3D) spatial perception. Pickhardt et al. (Pickhardt, P. J. et al., *The New England Journal of Medicine*, 349(23):2191-2200 (2003)) have reported high sensitivity in detecting polyps using virtual colonic luminal fly-through navigation. The effectiveness of virtual endoscopic navigation in computer-aided diagnostic systems has received increasing recognition.

Most existing CTC protocols require a patient to be scanned in both supine and prone positions to increase sensitivity in detecting colonic polyps. As such, a reference system between scans becomes necessary. However, the conventional centerline approach (e.g., see Bitter, 1. et al., *IEEE Transactions on Visualization and Computer Graphics*, 7(3): 195-206, (2001); Frimmel, H. et al., *Proceedings SPIE Medical Imaging '03*, SPIE 5031:381-387 (2003); Hong, L. et al., *Proceedings SIGGRAPH '97*, pp. 27-34 (1997); Iordanescu G. et al., *Academic Radiology*, 10: 1291-1301 (2003); Paik, D. S. et al., Med. Phys., 25(5):629-637 (1998)) generates only the longitudinal distance along the colon, which has a large variation and is less precise. Consequently centerline-based polyp registration requires colon length normalization (e.g., see Brickman, D. et al., *Proceedings of RSNA Annual Meeting*, p. 633, (2004); Li, P. et al., *Med. Phys.*, 31(10):2912-2923, October (2004)). Besides, this approach also lacks the necessary orientation information to synchronize the virtual navigation cameras in both scanned positions. This makes the visual validation of polyp registration between scans a very time-consuming and a rather cumbersome task.

There is therefore a need for a virtual colonoscopy methodology that does not suffer from the above shortcomings.

BRIEF SUMMARY OF THE INVENTION

The present invention provides a coordinate system and a method for guiding virtual colonoscopic navigation and for the registration of lesions in multiple scanned data sets using the coordinate system.

In one aspect, the present invention provides a computer-assisted method for detecting surface features in a virtual colonoscopy. The method includes providing a three-dimensional construction of a computed tomography colonography surface; creating a path along the teniae coli from the proximal ascending colon to the distal descending colon on the colonography surface; forming an indexed computed tomography colonography surface using the created path; and registering the supine and prone scans of the computed tomography colonography surface using the indexed computed tomography colonography surface. The method also includes navigating the internal surface of the computed tomography colonography using the indexed computed tomography colonography surface.

The embodiments of the present invention provide a teniae coli defined coordinate system that can synchronize navigation and register polyps in multiple scan data sets. This cylindrical coordinate system was used to synchronize virtual cameras between the supine and prone CTC data sets. Polyps visible on both supine and prone scans were located and matched more efficiently with the teniae coli guided navigation implementation.

The registration method in accordance with the embodiments of the present invention was applied to 3 patients resulting in 6 data sets (supine and prone positions). Each patient had one polyp which was visible in both scans and was located between the cecum and the upper descending colon. All 3 polyps were well-matched between scans in terms of tenia longitudinal distance and circumferential location. This was a significant improvement for polyp registration in the realm of optical colonoscopy and CT colonography.

For a further understanding of the nature and advantages of the invention, reference should be made to the following description taken in conjunction with the accompanying drawings.

BRIEF DESCRIPTION OF THE DRAWINGS

FIG. 3a is an exemplary model of a tubular surface path of a section of the colon.

FIG. 3b is a flattened rectangular surface representation of FIG. 3a.

In FIG. 7, the synchronous navigation system is shown with the supine scan on the left and the prone scan on the right. A polyp (arrows) appears in the same location on both view panels. The positions and orientations of the virtual cameras on both scans are controlled by a set of sliders and controlling textboxes. The first textbox and slider pair control the centerline distance (in cm). The second textbox and slider pair rotate the cameras right and left (in degrees). The third textbox and slider pair rotate both the cameras up and down (in degrees). The fourth textbox and slider pair control the field of view for the zoom factor (in 0.1 radians). The fifth textbox controls the centerline distance offset between the two cameras (in cm).

DETAILED DESCRIPTION OF THE INVENTION

Figure 1:
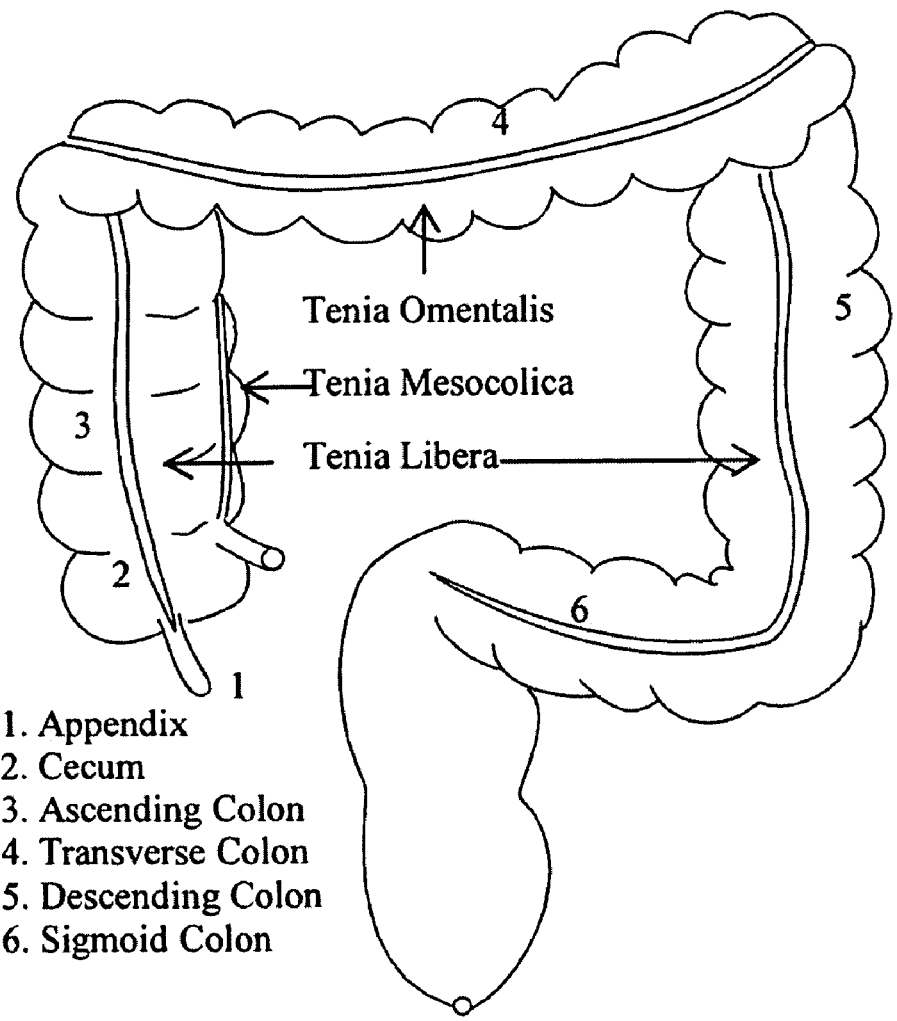
FIG. 1 is a simplified diagram of the colon and the teniae coli configuration.

The embodiments of the present invention provide a novel method for guiding virtual colonoscopic navigation and registration by using teniae coli as anatomical landmarks. Teniae coli are three bands of a longitudinal smooth muscle on the surface of the colon. They are parallel, equally distanced and form a piecewise triple helix structure from the appendix to the sigmoid colon. FIG. 1 illustrates a human colon and the configuration of teniae coli. As teniae coli are distinguishable morphologically, they are named tenia omentalis (TO), tenia mesocolica (TM), and tenia libera (TL) according to their position on the transverse colon. Because of these characteristics, they are preferred as references for guiding virtual navigation and polyp registration.

In one aspect, the embodiments of the present invention are directed to the detection of the teniae coli and their use for setting up a coordinate system for navigation and registration. Accordingly, the methods of the present invention can include a semi-automatic method for extracting the teniae coli from a colonic surface model reconstructed from CTC. Another aspect of the present invention is directed towards a teniae coli guided navigation system.

Figure 2A:
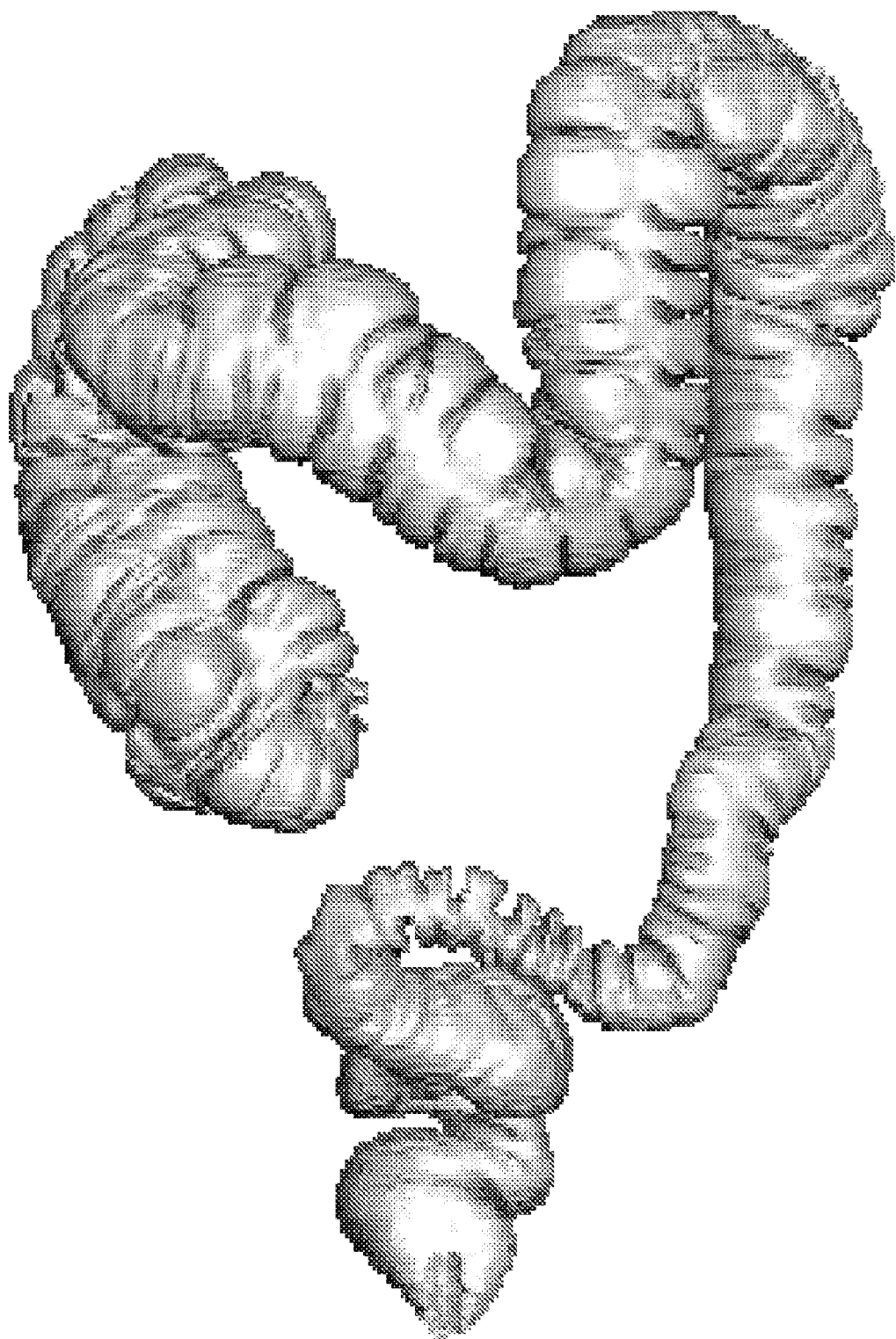
FIG. 2a is a colon model showing a segmented colonic surface.

The methods in accordance with the embodiments of the present invention were practiced on actual colonoscopy data from three patients. Each patient underwent proper bowel preparation before CT scanning. A small amount of oral contrast agent was given to opacify residual fluid and feces. Colonic distention was achieved by patient-controlled rectal insufflation of room air. Each patient was scanned supine and prone with 2.5-mm collimation and 1-mm reconstruction interval. Colon segmentation was performed by using a region-growing algorithm (e.g., see Summers, R. M. et al., *AJR*, 184:105-108 (January 2005)). The colonic surface model was reconstructed by using the marching cubes algorithm (e.g., see Lorenson, W. et al., *Proceedings of SIG-GRAPH '87*, 21:163-169 (1987); Nielson, G. M. et al., *Proceedings of Visualization '02*, pp. 459-466 (2002)). FIG. 2a shows a segmented colonic surface which constitutes the initial input data for the methods of the present invention.

Each selected patient had at least one colonoscopically proven polyp that was visible on both supine and prone CT scans. Additionally, these polyps were located between the cecum and descending colon. For ease of comparison with visual inspection, the examples described herein, focused on the colon between the cecum and the upper descending colon where visual inspection can be performed. However, the embodiments of the present invention are not limited to the detection of surface features for a particular section of the colon.

Teniae Coli Detection

Haustra of the colon are sacculations in the wall of the colon produced by adaptation of its length to that of the teniae coli, or by the arrangement of the circular muscle fibers. Referring to the colon model in FIGS. 1 and 2, teniae coli can be observed where haustral folds meet. However, it is no trivial task to extract them since the highly flexible colon varies dramatically between people and scans. Distention also varies in different sections of the colon. Further, tenia mesocolica and tenia libera tend to be obscured at highly bended sections. Therefore, the tenia mesocolica is used as a starting place for the extraction of the teniae coli. Tenia omentalis is more visible and less tortuous because it is attached to the back in the ascending colon, to the omental apron in the transverse colon, and to the back again in the upper descending colon. In a CTC, the tenia omentalis can be found at the cecum region by first locating the ileocecal valve which causes a dent on the surface and makes the cecum a hook-like tube (see FIG. 5a). In an upright position, tenia omentalis is located on the right of the ileocecal valve. Based on the above observations, a three-step semi-automatic method is used to locate the tenia omentalis. In one embodiment, the tenia omentalis is manually located. The other two teniae coli are then derived automatically.

The method for locating the teniae coli on the CTC in accordance with one embodiment of the present invention includes the following three steps:

1. Haustral folds, a ridge-like structure, are detected by a curvature-based filter (e.g., see Huang, A. et al., *Proceedings SPIE Medical Imaging '05*, SPIE 5746:393-402 (2005)) and assigned a different color to aid the users in identifying the teniae coli more quickly.

2. A set of sequential points along the tenia omentalis from the cecum to the upper descending colon are selected manually and a path is derived from these points automatically.

3. The manually selected colonic section is flattened (i.e. virtually dissected and flattened along the tenia omentalis) and parameterized numerically. The other two teniae coli are derived from the flattened surface at ⅓ and ⅔ of the circumference.

Figure 2B:
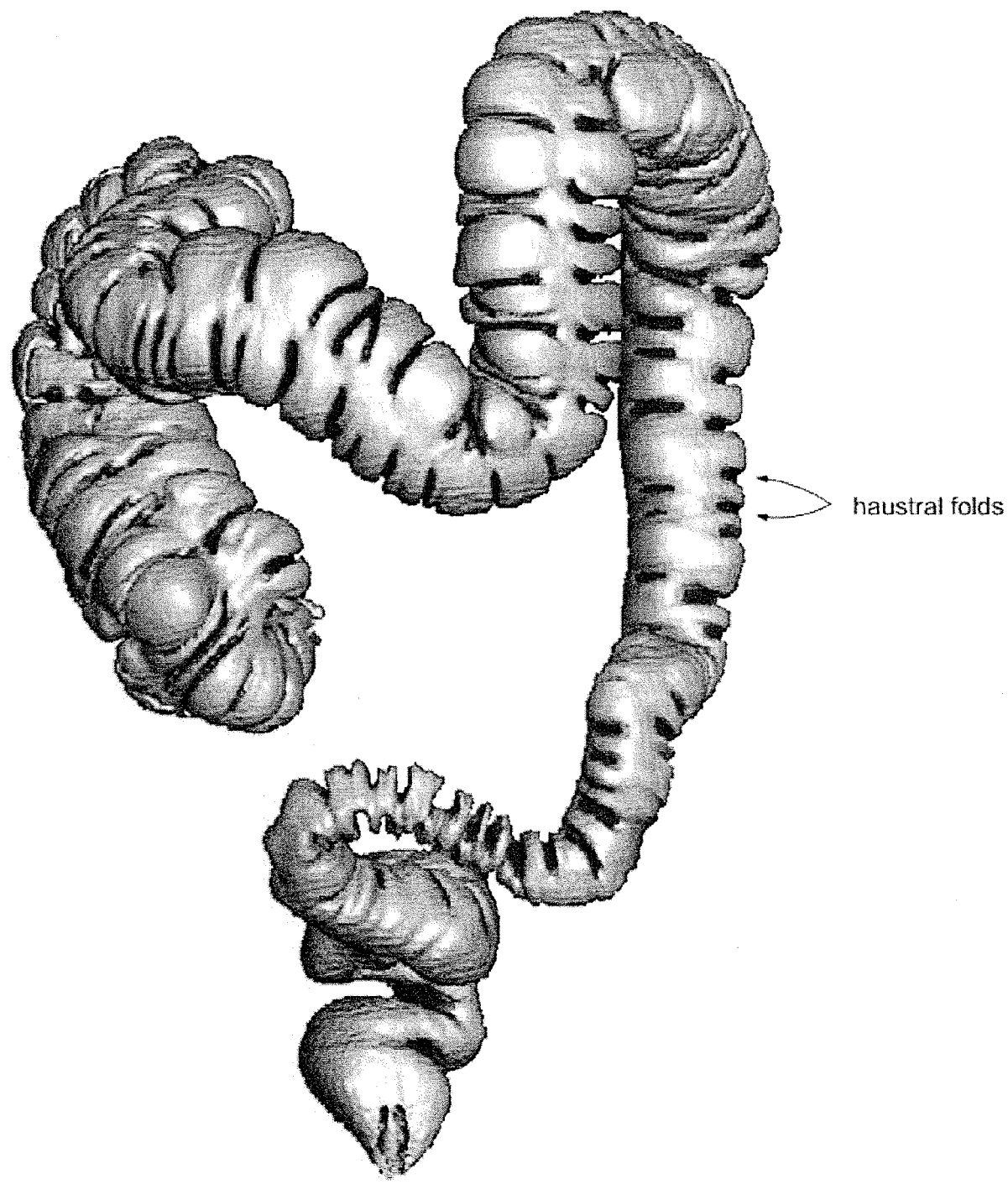
FIG. 2b is an image of the model of FIG. 2a showing the detected haustral folds.
Figure 2C:
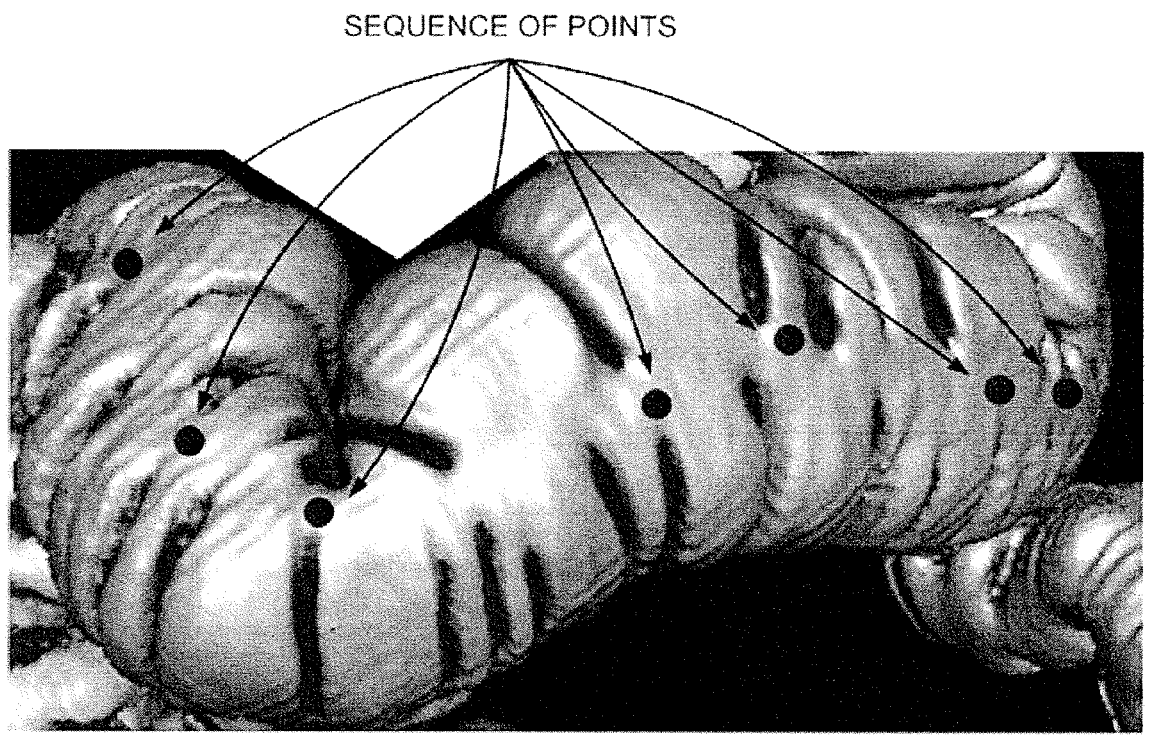
FIG. 2c is a detailed view corresponding to FIG. 2b with selected points along the tenia omentalis.
Figure 2D:
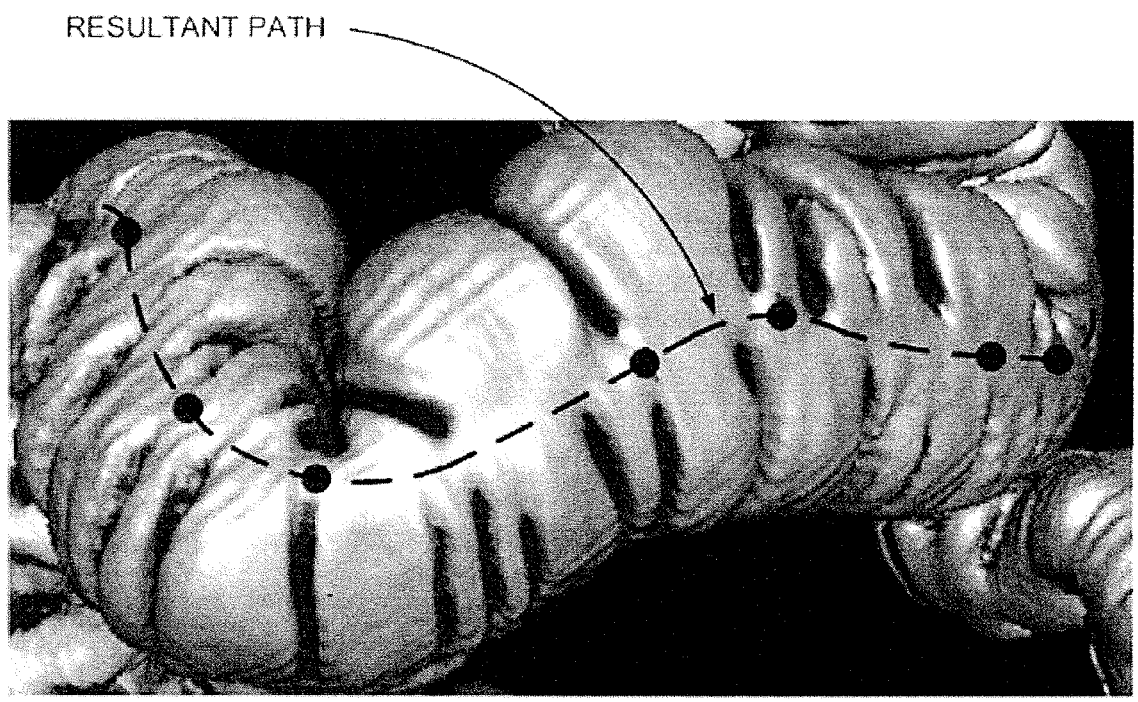
FIG. 2d is a detailed view corresponding to the FIG. 2c showing the derived path along the selected points along the tenia omentalis.

The selection of points on the tenia omentalis can require user input. The remainder of the sub steps for detecting the teniae coli are automatic. A the step-by-step process in detecting the tenia omentalis is discussed with reference to FIGS. 2a, 2b, 2c, and 2d. FIG. 2a shows a segmented colonic surface as the input data. In FIG. 2b, haustral folds are detected by curvature-based filtering and colored (e.g. in blue). In FIG. 2c, a sequence of points along the tenia omentalis are manually selected and colored (e.g. in red or other high contrast color). A graph search algorithm such as one proposed by Dijkstra (e.g., see Dijkstra, E. W. *Numerische Mathematik*, 1: 269-271 (1959)) can be implemented to find the shortest path that connected the selected points sequentially within the triangular mesh surface. The resultant path is shown in FIG. 2d as a marked line. The colon flattening related work is described below.

Colon Flattening

One fundamental problem that virtual colonoscopy shares with optical colonoscopy is that the surface visibility is limited by the camera viewing model. Vos et al. have reported (e.g., see Vos, F. M. et al., *Radiology*, 880:878-885 (September 2003)) that only 93.8% of the surface area is visible with a conventional 3D virtual endoscopic display. Colon flattening or colon unfolding (e.g., see Vilanova Bartroli, A. et al., *Proceedings of Visualization '01*, pp. 411-418, (2001); Haker, S. et al., *IEEE Transactions on Medical Imaging*, 19:7 (July 2000)) can improve surface visibility.

Several approached may be used to accomplish the colon flattening. One approach increases the surface visibility by expanding view angles. In Vos (Vos, F. M. et al., *Radiology*, 880:878-885 (September 2003)), six camera views (directed to the front, back, up, down, left, and right) are obtained and projected onto a cube. The cube is then unfolded and displayed. The sequence of unfolded cubes is shown as cine images. With this unfolded cube display, the visibility of the colon surface has been improved to 99.5% (Vos, F. M. et al., *Radiology*, 880:878-885 (September 2003)). Another approach projects or resamples the tubular colon surface on a cylinder and displays it over a plane. Based on electrical field theory, Wang et al. introduce curved cross sections that intersect the colon consecutively (Wang, G. et al., *IEEE Transactions on Medical Imaging*, 17:2, (April 1998)). These curved cross sections are derived from the electrical force lines formed by a charged central path. Such curved surfaces never intersect each other and are locally orthogonal to the center path. The advantage of these two projection approaches is that they can be applied to both surface and volume based rendering methods. However, deformations caused by projection are a concern in medical applications. To minimize deformation, Haker et al. (Haker, S. et al., *IEEE Transactions on Medical Imaging*, 19:7 (July 2000)) map the colon onto a flat surface such that local geometry is preserved by an angular preservation criterion. The method of Haker et al. can be classified as a surface parameterization method.

Uniform Parameterization

Figure 3:
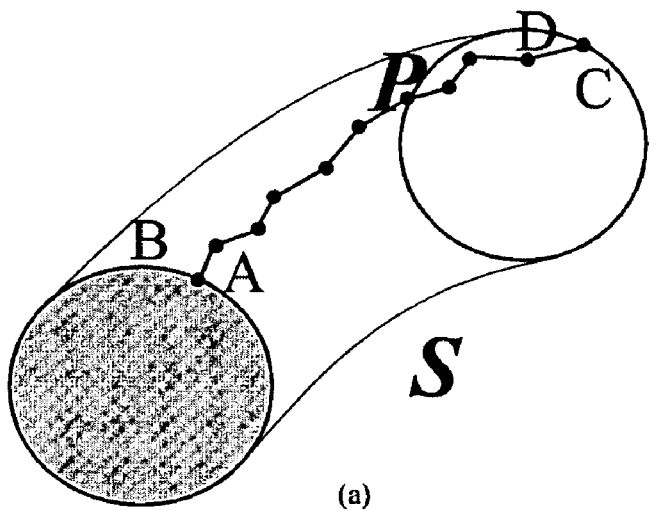
Figure 3:
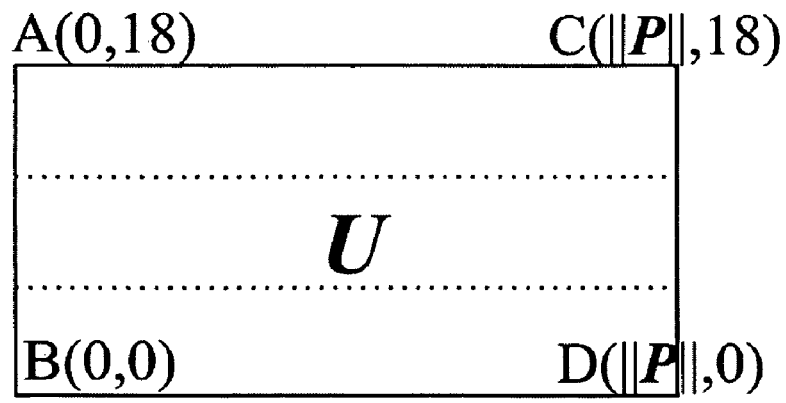

Several parameterization methods can be used, including parameterization methods that preserve area (e.g., see Desbrum, M. et al., Eurographics '02, *Computer Graphics Forum*, 21:2 (2002)), angle (e.g., see Haker, S. et al., *IEEE Transactions on Medical Imaging*, 19:7 (July 2000); Haker, S. et al., *IEEE Transactions on Visualization and Computer Graphics*, 6(2)2000:181-189 (2000)), or shape (e.g., see Floater, M. S. *Computer Aided Geometric Design*, 14:231-250 (April 1997). One embodiment of the present invention uses a chord length parameterization approach to set up the boundary for the colonic section and solve for the internal nodes by a uniform parameterization method (e.g., see Floater, M. S. *Computer Aided Geometric Design*, 14:231-250 (April 1997)). FIG. 3 illustrates the process for deriving the other two teniae coli through parameterization. From the semi-automatically selected path P, described above, a tubular surface patch S is formed by finding the circular boundaries at both ends as shown in FIG. 3a. S is then cut open at P and mapped onto a rectangular parameterization U as shown in FIG. 3b.

In the parameterization in accordance with one embodiment of the present invention, let $x_1 \in R^3$ represent the vertices on S and $u_1 \in reR^2$ their corresponding parameters in U. The parameters at the corners of, on the boundary of, and within U can be decided as follows. First, the length of U can be assigned as the length of P, denoted as $\|P\|$, while the width of U can be randomly chosen as 18 cm. Therefore, parameters at the four corners of U were (0,0), (0,18), ($\|P\|$,0), and ($\|P\|$,18) respectively. Second, parameters on the boundary can be interpolated from the four corners based on a chord length criterion. Then, every internal node $u_1$ can be solved from a sparse linear system $$u_i = \sum_{u_j \in N} \lambda_{i,j} u_j,$$

where N is the set of $u_1$'s neighboring nodes which include corner and boundary nodes and let n represent the size of N, $\lambda_{i,j}$ is equal to 1/n. After solving the linear system, the other two teniae coli can be derived from points $x_k \in S$ where their corresponding parameters $u_k \in U$ are located at approximately ⅓ (6 cm) and approximately ⅔ (12 cm) of the circumference.

In addition to the method described above for locating the teniae coli on the CTC, other alternative methods can also be used to locate a path along the teniae coli. One alternative method can find the path based on connecting the edges of the haustral folds. Another alternative method for locating a path along the teniae coli can measure the curvature of the surface of the colon and then scan or detect band-like structures that represent the tenia.

Virtual Camera Synchronization

Figure 4:
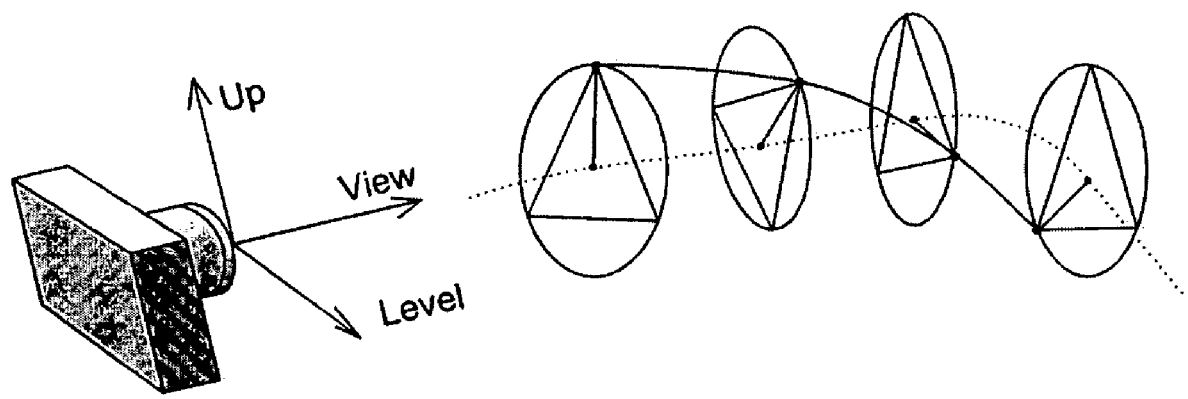
FIG. 4 is a simplified exemplary diagram of the teniae coli based virtual camera synchronization in accordance with one embodiment of the present invention.

There can be three elements in a camera view model. They are the camera position, viewing direction, and up direction. While the viewing and up directions form two main axes of a local camera coordinate system, a third axis can be derived as the cross product of those two main axes, as shown in FIG. 4.

The conventional centerline-based virtual colonoscopy paradigm provides only the camera position (on the centerline) and the viewing direction (the centerline tangent). The virtual camera still has the freedom to rotate about the viewing direction axis. To find the up direction, one common practice is to use a preferred up direction such that it corresponds as closely as possible to the up direction in the world coordinate system. However, as pointed out by Paik et al. (e.g., see Paik, D. S. et al., Med. Phys., 25(5):629-637 (1998)), at singular orientations when the up direction coincides with the viewing direction, the preferred up direction is not well defined. This can lead to sudden 180 degrees twists that can disorient the observer and may even cause nausea. Paik et al. suggest using the information from the previous frame to minimize the frame-to-frame twist (Paik, D. S. et al., Med. Phys., 25(5):629-637 (1998)). However, their approach falls short in synchronizing the virtual cameras between scans because the resultant up direction is not anatomically oriented.

In accordance with the embodiments of the present invention the up direction for the virtual camera is derived from the teniae coli. There are certain properties that make a teniae coli based coordinate system attractive in virtual navigation and polyp registration. First, as teniae coli are morphologically distinct, the local coordinate system defined by them is unique. This property makes possible the camera synchronization between scans. It also makes the circumferential location related to teniae coli another useful anatomical record, in addition to the colon longitudinal distance. Furthermore, the teniae coli are continuous and do not twist sharply. This can minimize the frame-to-frame twist in virtual navigation.

After completing the above parameterization and extracting a navigation path is determined for the virtual camera(s). The navigation path planning algorithm in accordance with the embodiments of the present invention includes the following steps:

1. Deriving a centerline as the weight center of three teniae coli.
2. Computing the viewing direction as the tangent of the centerline.
3. Choosing the up direction such that it points to one particular tenia coli (tenia omentalis for example).
4. Synchronizing the positions of cameras based on centerline distance and orienting the cameras according to the local coordinate system.

FIG. 4 shows a navigation system with the viewing direction tangent to the centerline (dotted line) and the up direction pointing to one particular tenia coli (solid line).

Synchronous Navigation

Using the above methodology a synchronous navigation system is developed with two side-by-side virtual colonoscopic view panels (for the supine and prone data sets respectively) and one single camera control unit. The synchronous views can be achieved by two mechanisms. One is to orient both the supine and prone virtual cameras according to a tenia coli-based local coordinate system as described above. The other is to allow manual adjustment of the centerline location offset between two cameras. The up-direction in both the supine and prone scans can be derived from the same tenia coli and the supine and prone virtual cameras can be positioned at the same centerline distance, so that the new local coordinate systems are anatomically correlated and the resultant endoluminal views are synchronized according to the centerline and teniae coli. The more accurate the centerline and teniae coli estimates are, the better synchronization can be achieved. As a result, the navigation system has the capability to present the same regions to radiologists for interpretation simultaneously. The synchronous navigation system in accordance with one embodiment of the present invention can be developed in Visual C++ (Microsoft, Richmond, Wash.) programming language with Qt (Oslo, Norway) and Open Inventor libraries. The software can be run on a Dell workstation (Dell, Austin, Tex.) with dual 1.5 GHz Xeon processors (Intel, Santa Clara, Calif.), 2 GB memory, and Wildcat II 5110 graphics card (3Dlabs, Milpitas, Calif.). The methodologies described herein for the teniae coli defined coordinate system that can synchronize navigation and register polyps in multiple scan data sets can be implemented as computer implemented software routines. Such routines can be stored on computer-readable media for execution by a host compute. As used herein, a variety of computer-readable media may be used for the recording media that stores the image analysis tool software, including: CD-ROM, flexible disks, magneto-optic discs, IC cards, ROM cartridges, punched cards, and internal storage devices (memories, such as RAM and ROM) and external storage devices.

Figure 7:
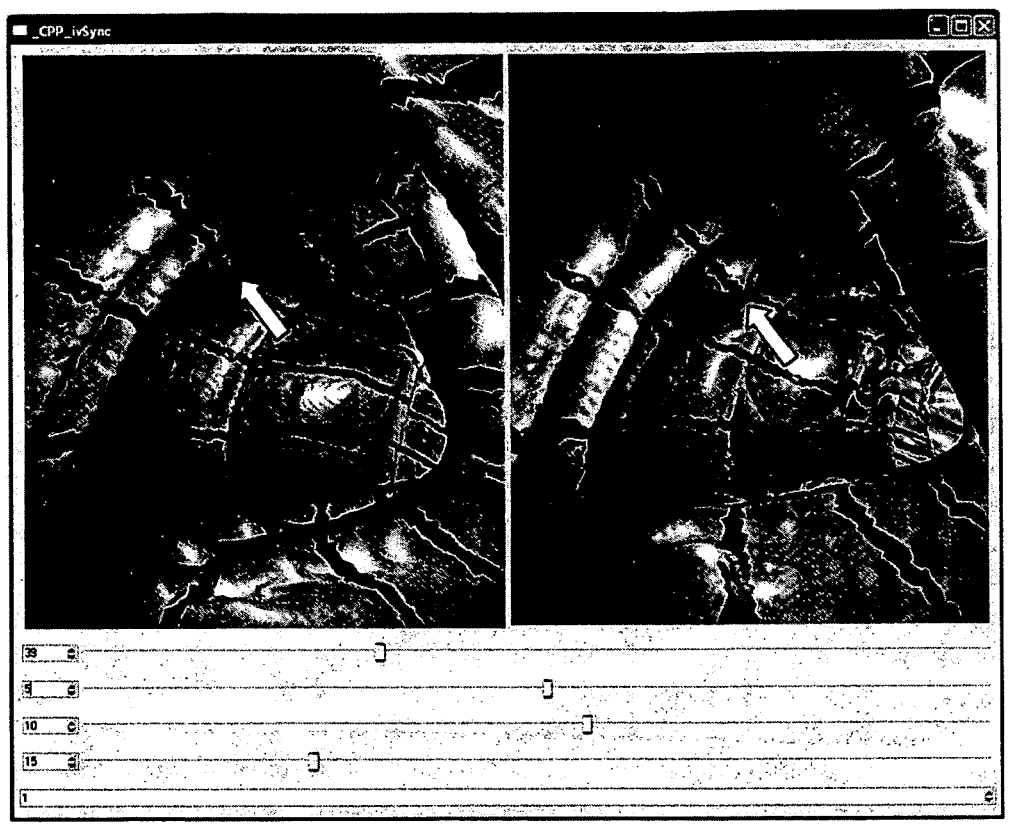
FIG. 7 is an exemplary image from the synchronous navigation system in accordance with one embodiment of the present invention.

The synchronous navigation system was successfully implemented by using the TO to set the up direction for the fly-through of both the supine and prone CTC surfaces. Because the prone and supine views progressed to similar centerline positions and orientations during navigation, the polyp appears simultaneously on both viewing panels in similar locations, for example as is shown in FIG. 7. Although the synchronization only requires the information of centerline and one tenia coli, the parameterization serves two purposes. First, it is used to derive the grid lines on FIG. 7 to help locate corresponding locations between different scanned positions. Second, the centerline was derived as the average of the manually picked TO and inferred TM and TL. The resultant centerline and the TO are in one-to-one correspondence.

Figure 5:
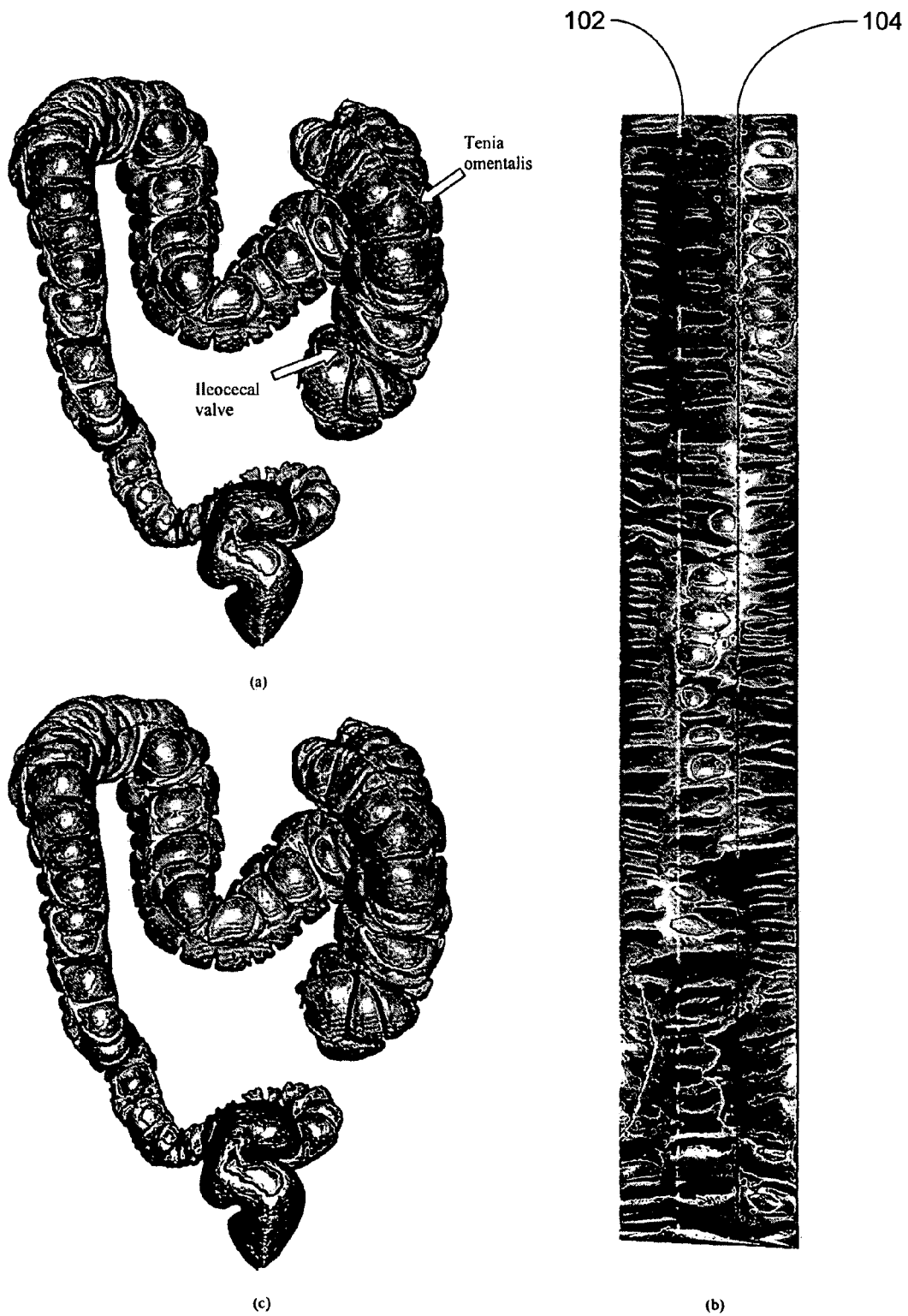
FIG. 5a is an image of a colon showing a selected tenia omentalis.
FIG. 5b is an image of a flattened colon corresponding to FIG. 5a in accordance with the embodiments of the present invention.
FIG. 5c corresponds with the image of FIG. 5a showing the detected teniae coli back-projected to the original colon surface.

The functioning of the above methodology for teniae coli detection and its use for navigating a virtual colonoscopy is described in the following examples, where the teniae coli for 6 data sets from 3 patients was detected by using the method with a uniform parameterization. The detected teniae coli matched well with a visual inspection. FIG. 5b shows the resultant parameterization of a tubular section (FIG. 5a) of the colon. The tenia omentalis is shown with markings or strips 102 (e.g. yellow), and 104 (e.g., green), the tenia mesocolica is marked as 104 (e.g. green), and the tenia libera marked as 102 (e.g., yellow). The haustral folds shown in FIG. 5b align well with each other vertically and horizontally despite of the tortuosity of colon. Further, the oval-shaped bumps, which were caused by the existence of contrast fluid, did not seem to influence the parameterization. The majority of haustral folds meet at approximately ⅓ and approximately ⅔ of the circumference within a small margin of error. The grid-line mapped 3D construction of the CTC is shown in FIG. 5c.

Figure 6:
FIGS. 6a-f are images of the interior of a colon showing polyps viewed in the supine and prone scans as virtually navigated in accordance with one embodiment of the present invention.
Figure 6:
Figure 6:
Figure 6:
Figure 6:
Figure 6:

All three polyps visible on both supine and prone positions were matched accurately and efficiently by using the teniae coli defined virtual navigation coordinate system. The polyps viewed by the synchronized cameras in both supine and prone positions are shown in FIG. 6. The first polyp was located on the tenia mesocolica in both supine and prone positions. It was found at 86 and 84 cm in centerline distance away from the cecum respectively. The second polyp was located on the tenia libera and was found at 83 and 87 cm respectively. The third polyp was located by the tenia mesocolica and was found at 67 and 66 cm respectively. The results are summarized in Table 1.

TABLE 1

Polyp registration results

| Polyp No. | Scan position | Centerline distance (cm) | Location related to teniae coli |
|---|---|---|---|
| 1 | supine | 86 | On tenia mesocolica |
| 1 | prone | 84 | On tenia mesocolica |
| 2 | supine | 83 | On tenia libera |
| 2 | prone | 87 | On tenia libera |
| 3 | supine | 67 | By tenia mesocolica |
| 3 | prone | 66 | By tenia mesocolica |

The functioning of the above methodology for teniae coli detection and its use for registering the supine and prone scans is not limited to solely registering scans taken of a patient at the same time. The methods described above can also be used to register scans obtained at different time, so as to allow for comparisons. Moreover, the registration methodology in accordance with the embodiments of the present invention can be used as a part of a computer-aided colonic polyp detection system, to increase the accuracy of the system by enabling the matching of detections on the supine and prone scans taken at the same or at different times.

All publications, and descriptions mentioned above are herein incorporated by reference in their entirety for all purposes. None is admitted to be prior art.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. And, as will be understood by those skilled in the art, the present invention may be embodied in other specific forms without departing from the essential characteristics thereof. These other embodiments are intended to be included within the scope of the present invention, which is set forth in the following claims.

What is claimed is:

1. A computer-assisted method for detecting surface features in a virtual colonoscopy of a patient's colon, comprising:
   providing a three-dimensional construction of a computed tomography colonography surface of the patient's colon;
   creating a path along the teniae coli from the proximal ascending colon to the distal descending colon on the colonography surface; and
   forming an indexed computed tomography colonography surface using the created path.

2. The method of claim 1 wherein said forming an indexed computed tomography surface comprises flattening a portion of the surface along the tenia omentalis portion of the teniae coli into a rectangular projection;
   marking the rectangular projection with grid lines corresponding at least to the tenia mesocolica and the tenia libera; and
   mapping the grid lines back onto the colonography surface, to form an indexed computed tomography colonography surface.

3. The method of claim 1 further comprising navigating the internal surface of the computed tomography colonography using the indexed computed tomography colonography surface.

4. The method of claim 1 further comprising locating the teniae coli on the computed tomography colonography surface.

5. The method of claim 1, further comprising:
   providing a three-dimensional construction of a second computed tomography colonography surface of the patient's colon;
   creating a path along the teniae coli from the proximal ascending colon to the distal descending colon on the second colonography surface; and
   forming a second indexed computed tomography colonography surface by using the created path on the second colonography surface.

6. The method of claim 2 wherein said flattening a portion of the surface along the tenia omentalis portion of the teniae coli into a rectangular projection comprises virtually dissecting and flattening the portion of the surface along the tenia omentalis and parameterizing the portion of the surface numerically.

7. The method of claim 3 wherein said navigating comprises forming a navigation path along the internal surface of the computed tomography colonography, wherein said forming a navigation path comprises:
   deriving a centerline as the weight center of the teniae coli;
   computing a viewing direction as the tangent of the centerline;
   choosing an up direction such that it points to one particular tenia coli; and
   orienting a virtual camera using the viewing direction and then the up direction.

8. The method of claim 3 wherein said navigating comprises identifying the position of surface features in the computed tomography colonography.

9. The method of claim 8 wherein the position is a circumferential position.

10. The method of claim 9 wherein the surface feature comprises one or more polyps.

11. The method of claim 4 wherein said locating the tenia coli comprises manually locating the tenia omentalis and automatically deriving the tenia mesocolica and the tenia libera.

12. The method of claim 11 wherein said manually locating comprises receiving operator input.

13. The method of claim 11 wherein said manually locating the tenia omentalis comprises,
   detecting the haustral folds using a curvature-based filter;
   assigning a different color to the haustral folds, so as to enhance the identification of the teniae coli;
   selecting one or more points along the tenia omentalis from the cecum to the upper descending colon; and
   deriving a path through the one or more points.

14. The method of claim 11 wherein said automatically deriving the tenia mesocolica and the tenia libera comprises flattening and parameterizing a colonic section comprising the tenia omentalis to form a flattened surface; and deriving the tenia mesocolica and the tenia libera from the flattened surface at $1/3$ and $2/3$ of the circumference of the colonic section respectively.

15. The method of claim 5, wherein the computed tomography surface and the second computed tomography surfaces are obtained from supine and prone scans.

16. The method of claim 5, further comprising matching a feature on the indexed surface with a feature on the second indexed surface.

17. The method of claim 5, further comprising:
   navigating the internal surface of the computed tomography surfaces using the indexed computed tomography surface; and
   navigating the internal surface of the second computed tomography surface using the second indexed computed tomography surface.

18. The method of claim 17, wherein navigating the internal surfaces of each of the computed tomography surfaces comprises:
   deriving a centerline as the weight of the teniae coli;
   computing a viewing direction as the tangent of the centerline;
   choosing an up direction such that it points to one particular tenia coli; and
   orienting a virtual camera using the viewing direction and then the up direction.

19. The method of claim 18, further comprising synchronizing the positions of the virtual cameras based on a distance along the centerline.

20. A computer readable medium having instructions thereon for causing a computer to perform instructions for detecting surface features in a virtual colonoscopy, comprising:
   generating a three-dimensional construction of a computed tomography colonography surface;
   creating a path along the teniae coli from the proximal ascending colon to the distal descending colon on the colonography surface;
   flattening a portion of the surface along the tenia omentalis portion of the teniae coli into a rectangular projection;
   marking the rectangular projection with grid lines corresponding at least to the tenia mesocolica and the tenia libera;
   mapping the grid lines back onto the colonography surface, to form an indexed computed tomography colonography surface; and
   navigating the internal surface of the computed tomography colonography using the indexed computed tomography colonography surface.

* * * * *